US008299206B2

(12) United States Patent
Fox et al.

(10) Patent No.: US 8,299,206 B2
(45) Date of Patent: *Oct. 30, 2012

(54) METHOD OF SYNTHESIS OF MORPHOLINO OLIGOMERS

(75) Inventors: Christina Mary Josephine Fox, Corvallis, OR (US); Dwight D. Weller, Corvallis, OR (US)

(73) Assignee: AVI BioPharma, Inc., Corvallis, OR (US)

( * ) Notice: Subject to any disclaimer, the term of this patent is extended or adjusted under 35 U.S.C. 154(b) by 552 days.

This patent is subject to a terminal disclaimer.

(21) Appl. No.: 12/271,036

(22) Filed: Nov. 14, 2008

(65) Prior Publication Data

US 2009/0131632 A1    May 21, 2009

Related U.S. Application Data

(60) Provisional application No. 60/988,192, filed on Nov. 15, 2007.

(51) Int. Cl.
*C07D 413/04* (2006.01)
*C07D 413/14* (2006.01)
*C07K 9/00* (2006.01)
(52) U.S. Cl. ............ 528/398; 528/403; 544/81; 544/82; 544/118
(58) Field of Classification Search ............... 528/398, 528/403; 544/81, 82
See application file for complete search history.

(56) References Cited

U.S. PATENT DOCUMENTS

| 5,185,444 A * | 2/1993 | Summerton et al. ............ 544/81 |
| 5,510,476 A | 4/1996 | Ravikumar et al. ........ 536/25.31 |
| 2007/0135333 A1 | 6/2007 | Geller et al. |
| 2008/0194463 A1 | 8/2008 | Weller et al. ...................... 514/7 |
| 2009/0088562 A1 | 4/2009 | Weller et al. .................. 536/24.5 |
| 2010/0234281 A1 | 9/2010 | Weller et al. ...................... 514/8 |

FOREIGN PATENT DOCUMENTS

| WO | WO 98/17281 A1 | 4/1998 |
| WO | WO 2008/008113 A1 | 1/2008 |
| WO | WO 2008/036127 A1 | 3/2008 |

OTHER PUBLICATIONS

International Preliminary Report on Patentability, issuance date May 18, 2010, for PCT/US2008/012804, filed Nov. 14, 2008, 6 pages.
Bodanszky, M. and Bodanszky, A., "Coupling in Absence of Tertiary Amines: III. Deprotection with the Help of the Carboxyl Components or its Activated Derivatives", *Int. J. Peptide Protein Res.*, 26:98-104 (1985).
Klostermeyer et al. "Removal of Acid-Labile Amino-Protecting Groups by Pyridinium Salts" *Anorganische Chemie, Organische Chemie, Biochemie, Biophysik, Biologie*, 28(5-6):334-338 (1973).
Summerton, J. and Weller, D., "Morpholino antisense oligomers: design, preparation, and properties." *Antisense Nucleic Acid Drug Dev.*, 7(3):187-95 (1997).
Mitsunobu, "The Use of Diethyl Azodicarboxylate and Triphenylphosphine in Synthesis and Transformation of Natural Products," *Synthesis* 1:1-28, 1981.
Abramova, T.V. et al., "Synthesis of Morpholine Nucleoside Triphosphates", *Tetrahedron Letters*, 45(22):4361-4364 (2004).
Abramova, T.V. et al., "New Oligonucleotide analogues based on Morpholine Subunits Joined by Oxalyl Diamide Tether", *Bioorgainic Chemistry*, 35:258-275 (2007).
Andrus, M.B., "Total Synthesis if the Hydroxyketone Kurasoin A Using Asymmetric Phase-Transfer Alkylation", *J. Org. Chem.*, 71:8651-8654 (2006).
Briggs, A.D. et al., "Acyloxymethyl and 4-Acyloxybenzyl Diester Prodrugs if Phospphonoformate" *Tetrahedron*, 52(47):14937-14950 (1996).
Castro, M.J. et al., "Gemini Surfactants from Alkyl Glucosides", *Tetrahedron Letters*, 38 (23):3995-3998 (1997).
The International Search Report and Written Opinion for PCT application PCT/US2008/012804, Search Report dated Apr. 7, 2009, 14 pages (2009).
Gaffney, B.L. and Jones, R.A. et al., "A New Strategy for the Protection of Deoxyguanosine During Oligonucleotide Synthesis", *Tetrahedron Letters*, 23(22):2257-2260 (1982).
Gaffney, B.L. and Jones, R.A. et al., "Synthesis of O-6-Alkylated Deoxyguanosine Nucleosides", *Tetrahedron Letters*, 23(22):2253-2256 (1982).
Gough et al., "The use of barium salts of protected deoxyribonucleoside-3' p-chlorophenyl phosphates for construction of oligonucleotides by the phosphotriester method: high-yield synthesis of dinucleotide blocks", *Nucleic Acids Research*, 7(37:19555-1964 (1979).
Himmelsbach, F. et al., "The p-Nitrophenylethyl (NPE) Group, A Versatile New Blocking Group for Phosphate abd Aglycone Protection in Nucleosides and Nucleotides", *Tetrahedron*, 40:59-72 (1984).
Iyer, R. et al., "Bioreversible Oligonucleotide Conjugates by Site-Specific Derivatization", *Bioorganic and Medicinal Chemistry Letters*, 7(7):871-876 (1997).
Jones et al., "The Protection of Uracil and Guanine Residues in Oligonucleotide Synthesis", *Tetrahedron Letters*, 22(7):4755-4758 (1981).
Kamimura, T. et al., "Diphenylcarbamoyl and Propionyl Groups: A New Combination if Protecting Groups for the Guamnine Residue", *Tetrahedron Letters*, 24(27):2775-2778 (1983).
Reese, "The Protection of Thymine and Guanine Residues in Oligodeoxyribonucleotide Synthesis", *J. Chem.Soc., Perkin Trans*. 1, 1263-1270 (1984).
Takaku, H. et al., "3,4-Dimethoxybenzyl Group: A New Protecting Group for the Guanosine Residue During Oligonucleotide Synthesis", *Chem Pharm Bull.*, 32(7) 2882-2885 (184), (1984).

* cited by examiner

*Primary Examiner* — Susannah Chung
(74) *Attorney, Agent, or Firm* — Seed IP Law Group PLLC (57) ABSTRACT

Improved methods are described for solid-phase synthesis of morpholino oligomers, in which a protected morpholino ring nitrogen is deprotected between coupling steps using a heterocyclic amine salt in a trifluoroethanol-containing solvent, where the salt is a salt of a heterocyclic amine, having a pKa in the range of 1-4 in its protonated form, with an acid selected from a sulfonic acid, trifluoroacetic acid, and hydrochloric acid. Examples are 3-chloropyridinium methanesulfonate (CPM) and 4-cyanopyridinium trifluoroacetate (CYTFA).

13 Claims, 4 Drawing Sheets

SEQUENCE LISTING

```
<160> NUMBER OF SEQ ID NOS: 4

<210> SEQ ID NO 1
<211> LENGTH: 20
<212> TYPE: DNA
<213> ORGANISM: Artificial Sequence
<220> FEATURE:
<223> OTHER INFORMATION: Synthetic oligomer

<400> SEQUENCE: 1
acgttgaggg gcatcgtcgc                                                    20

<210> SEQ ID NO 2
<211> LENGTH: 20
<212> TYPE: DNA
<213> ORGANISM: Artificial Sequence
<220> FEATURE:
<223> OTHER INFORMATION: Synthetic oligomer

<400> SEQUENCE: 2
ctgggatgag agccatcact                                                    20

<210> SEQ ID NO 3
<211> LENGTH: 22
<212> TYPE: DNA
<213> ORGANISM: Artificial Sequence
<220> FEATURE:
<223> OTHER INFORMATION: Synthetic oligomer

<400> SEQUENCE: 3
cttagtcatc gagatcttcg tg                                                 22

<210> SEQ ID NO 4
<211> LENGTH: 19
<212> TYPE: DNA
```

```
<213> ORGANISM: Artificial Sequence
<220> FEATURE:
<223> OTHER INFORMATION: Synthetic oligomer

<400> SEQUENCE: 4
gtgctcatgg tgcacggtc                                              19
```

METHOD OF SYNTHESIS OF MORPHOLINO OLIGOMERS

This application claims priority to U.S. Provisional Patent Application No. 60/988,192 filed Nov. 15, 2007, which is incorporated in its entirety herein by reference.

FIELD OF THE INVENTION

The invention relates to methods of synthesizing phosphorodiamidate-linked morpholino oligomers by coupling of morpholino subunit monomers, and in particular to improved procedures for deprotection of the protected morpholino ring nitrogen at each coupling step.

REFERENCES

Albert, A., *Physical Methods in Heterocyclic Chemistry*, Vol. I, A. R. Katritzky, Ed., Academic Press, pp 44 (1963).
Fisher, A., Galloway, W. J., and Vaughan, J., *J. Chem. Soc.* 3591 (1964).
Garrison, A. W. and Boozer, C. E., *J. Am. Chem. Soc.* 90(13): 3486-3494 (1968).
Ravikumar, V. et al., U.S. Pat. No. 5,510,476.
Summerton, J. E. and Weller, D. D., *Antisense Nucl. Acid Drug Dev.* 7(3):187-95 (1997).
Summerton, J. E. and Weller, D. D., U.S. Pat. No. 5,185,444 (1993).
Rogne, O., *J. Chem. Soc.* 727 (1970).

BACKGROUND

Phosphorodiamidate-linked morpholino oligomers, or PMO, are nucleic acid analogs which bind tightly and sequence specifically to complementary RNA and are useful in modulating protein synthesis and thus gene expression. These oligomers are composed of base-pairing recognition moieties (heterocyclic bases) supported by a morpholino backbone system. Morpholino subunits for use in synthesizing such oligomers can be prepared easily from the corresponding ribonucleosides, which are readily available and inexpensive precursors (see e.g. Summerton and Weller, 1993, 1997).

The morpholino nitrogen of a morpholino subunit is typically protected with a trityl or substituted trityl species. During oligomer synthesis, this group must be removed during each cycle to allow incorporation of the next subunit. Failure to completely remove the protecting group leads to N−1 deletion sequences that contaminate the desired oligomer product.

Figure 1:
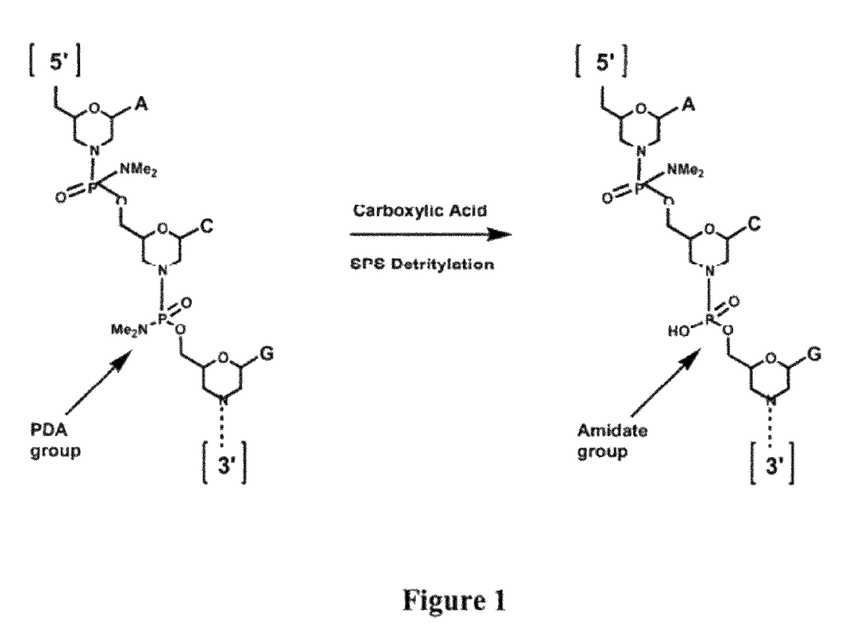
FIG. 1 shows conversion of the phosphorodiamidate (PDA) linkage into the phosphoramidate (amidate) linkages, in a side reaction that can occur upon treatment of phosphorodiamidate-linked morpholino oligomers (PMO) with carboxylic acids.

Trityl groups are conventionally removed with acid, and deprotecting reagents used for PMO synthesis have traditionally been carboxylic acids (Summerton et al. 1993, 1997). However, phosphorodiamidate groups are also sensitive to acid, and carboxylic acids useful for detritylation are also capable of promoting hydrolysis of phosphorodiamidate linkages to amidate species, as shown in FIG. 1, with the possibility of more extensive backbone degradation. For example, cyanoacetic acid in 20% acetonitrile/DCM is an effective deprotecting reagent, but it is found to cause substantial (5-10%) hydrolysis of phosphorodiamidate linkages in the PMO product.

Carboxylic acids must also be completely removed from the synthesis support resin prior to the coupling reaction; otherwise, by-products are formed that consist of truncated oligomers containing a 3'-acylated species.

For these reasons, improved reagents are needed for morpholino nitrogen deprotection in PMO synthesis.

SUMMARY

In one aspect, the invention provides a method of synthesizing a morpholino oligomer, the method comprising:

(a) reacting a solid-phase-supported morpholino subunit, having an unprotected ring nitrogen, with a base-protected morpholino subunit monomer, having a triarylmethyl-protected ring nitrogen and an activated phosphoramidate group on a 5'-exocyclic carbon, thereby forming a phosphorodiamidate linkage between the 5'-exocyclic carbon and the unprotected ring nitrogen;

(b) deprotecting the protected ring nitrogen, to form an unprotected ring nitrogen; and (c) repeating steps (a) and (b) one or more times with further base-protected morpholino subunit monomers;

wherein said deprotecting comprises exposing the triarylmethyl-protected ring nitrogen to a reagent solution comprising a heterocyclic amine salt in a trifluoroethanol-containing solvent, the salt being a salt of a heterocyclic amine, having a pKa in the range of 1-4 in its protonated form, with an acid selected from a sulfonic acid, trifluoroacetic acid, and hydrochloric acid.

The heterocyclic amine is preferably selected from the group consisting of: an electron withdrawing group-substituted pyridine, thiazole, pyridazine, pyrazole, triazole and electron withdrawing group-substituted substituted derivatives of these. Such electron withdrawing groups (EWG) include halogen, cyano, aldehyde, keto, carboxyester, and carboxamide.

Preferably, the heterocyclic amine is an electron withdrawing group-substituted pyridine, such as a chloro- or cyano-substituted pyridine. The amine salt is preferably a salt a sulfonic acid, such as an alkylsulfonate, (fluoroalkyl)sulfonate, or p-toluenesulfonate, or a trifluoroacetate. In selected embodiments, the salt is selected from 3-chloropyridinium methanesulfonate (CPM) and 4-cyanopyridinium trifluoroacetate (CYTFA).

The TFE-containing solvent preferably comprises dichloromethane and trifluoroethanol in volume ratio in the range of about 90:10 to 25:75, and more preferably in a volume ratio of about 80:20 DCM:TFE.

The triarylmethyl protecting group is selected from the group consisting of trityl (triphenylmethyl), 4-methoxytrityl, 4-methyltrityl, 4,4'-dimethyltrityl, and 4,4',4"-trimethyltrityl.

Typically, the synthesis further comprises cleaving the morpholino oligomer from the solid phase and deprotecting the bases, in accordance with standard procedures.

These and other objects and features of the invention will become more fully apparent when the following detailed description of the invention is read in conjunction with the accompanying drawings.

DETAILED DESCRIPTION OF THE INVENTION

I. Definitions of Terms

A "morpholino oligomer" refers to a polymeric molecule having a backbone which supports bases capable of hydrogen bonding to typical polynucleotides, wherein the polymer lacks a pentose sugar backbone moiety, and more specifically a ribose backbone linked by phosphodiester bonds which is typical of nucleotides and nucleosides, but instead contains a ring nitrogen with coupling through the ring nitrogen. A morpholino oligomer is composed of "morpholino subunit" structures, such as shown below, which in the oligomer are preferably linked together by phosphoramidate or phosphorodiamidate linkages, or their thio analogs, joining the morpholino nitrogen of one subunit to the 5' exocyclic carbon of an adjacent subunit. Each subunit includes a purine or pyrimidine base-pairing moiety Pi which is effective to bind, by base-specific hydrogen bonding, to a base in a polynucleotide.

Morpholino oligomers are detailed, for example, in co-owned U.S. Pat. Nos. 5,698,685, 5,217,866, 5,142,047, 5,034,506, 5,166,315, 5,185,444, 5,521,063, and 5,506,337, all of which are expressly incorporated by reference herein.

A "phosphorodiamidate" group comprises phosphorus having two attached oxygen atoms and two attached nitrogen atoms, and herein may also refer to phosphorus having one attached oxygen atom and three attached nitrogen atoms. In the intersubunit linkages of the oligomers described herein, one nitrogen is typically pendant to the backbone chain, and the second nitrogen is the ring nitrogen in a morpholino ring structure, as shown in formula I below. Alternatively or in addition, a nitrogen may be present at the 5'-exocyclic carbon, as shown in formulas II and III below.

In a thiophosphorodiamidate linkage, one oxygen atom, typically the oxygen pendant to the backbone in the oligomers described herein, is replaced with sulfur.

A "solid-phase-supported morpholino subunit" can be the first or any subsequent morpholino subunit monomer incorporated into a morpholino oligomer prepared by solid-phase stepwise synthesis as described herein. The subunit is attached to the solid support, or to a growing oligomer chain on the solid support, via its 5'-exocyclic carbon. "Base-protected" refers to protection of the base-pairing groups, e.g. purine or pyrimidine bases, on the morpholino subunits with protecting groups suitable to prevent reaction or interference of the base-pairing groups during stepwise oligomer synthesis. (An example of a base-protected morpholino subunit is the mo(Tr)C$^{Bz}$ subunit depicted below.)

An "activated phosphoramidate group" is typically a chlorophosphoramidate group, having substitution at nitrogen which is desired in the eventual phosphoramidate linkage in the oligomer. An example is (dimethylamino)chlorophosphoramidate, i.e. —O—P(=O)(NMe$_2$)Cl.

The terms "charged", "uncharged", "cationic" and "anionic" as used herein refer to the predominant state of a chemical moiety at near-neutral pH, e.g. about 6 to 8. Preferably, the term refers to the predominant state of the chemical moiety at physiological pH, i.e. about 7.4.

"Lower alkyl" refers to an alkyl radical of one to six carbon atoms, as exemplified by methyl, ethyl, n-butyl, i-butyl, t-butyl, isoamyl, n-pentyl, and isopentyl. In selected embodiments, a "lower alkyl" group has one to four carbon atoms, or 1-2 carbon atoms; i.e. methyl or ethyl. Analogously, "lower alkenyl" refers to an alkenyl radical of two to six, preferably three or four, carbon atoms, as exemplified by allyl and butenyl.

II. Improved Conditions for Deprotection of the Morpholino Ring Nitrogen in PMO Synthesis As noted above, deprotection of the morpholino ring nitrogen, which is typically protected by a triarylmethyl group such as trityl, in PMO synthesis, must be complete enough at each step to minimize N–1 deletion species. However, studies in support of the invention showed that reagents used in the prior art for this purpose caused an undesirable amount of backbone hydrolysis (see FIG. 1) and degradation. Therefore, efficient deprotecting reagents which at the same time minimized such hydrolysis were sought.

A simple assay was used to test the efficiency of various reagents in deprotection (typically detritylation) of N-protected morpholino subunits. A model compound, the tritylated moC$^{Bz}$ (i.e. benzoyl-protected cytosine morpholino) subunit shown below, is dissolved in the detritylation solution to be investigated. At various timepoints (e.g. 1, 2, 4 min), an aliquot was quenched and analyzed by TLC or HPLC for completion of morpholino nitrogen deprotection. Generally, for prediction of effective detritylation during solid phase PMO synthesis, this model reaction should be complete within about 2 minutes at room temperature.

mo(Tr)C$^{Bz}$

Using this assay and further experimentation, it was determined that various pyridinium salts of strong acids in mixtures of trifluoroethanol (TFE) and dichloromethane (DCM) are excellent catalysts for removing the triarylmethyl protecting group, e.g. a trityl group, from the morpholino nitrogen during solid phase PMO synthesis.

A minimum amount of TFE (~10% v/v or greater) is preferred for reasonable reaction rates and solubilization of the pyridinium salts. Because TFE alone does not swell naked polystyrene, mixtures with DCM (dichloromethane) are preferred, especially in the early cycles of PMO synthesis. Preferred solvent compositions include 10 to 75% TFE.

The use of the TFE solvent is believed to enhance the selectivity of the detritylation reaction over amidate formation (hydrolysis) and phosphorodiamidate (PDA) cleavage, described above, by addressing the differing mechanisms of PDA cleavage and detritylation. TFE is a potent hydrogen bonding solvent and decreases the reactivity of nucleophiles in solution; therefore, it is believed to slow the attack on phosphorus necessary for P—N bond cleavage. TFE also promotes SN1 type solvolysis reactions. The solvolytic character of amine detritylation reactions with TFE is evidenced by the yellow color of detritylation reaction mixtures and the orangish color of demethoxytritylation reaction mixtures.

Therefore, increasing TFE concentration is believed to both suppress nucleophilic attack on the PDA linkage and promote detritylation.

Unsubstituted pyridinium salts are not sufficiently acidic for optimal deprotection, but the use of pyridinium species containing electron withdrawing groups (EWG) (e.g. halogen, carbonyl, cyano) allows rapid cleavage of the protecting group. Generally at least 2% (w/v) of such a salt in the TFE:DCM solvent is sufficient for rapid detritylation. Preferred levels of the pyridinium salts are 2 to 10% (w/v).

Acids useful in forming the pyridinium salts include sulfonic acids, such as methanesulfonic, trifluoromethanesulfonic, and p-toluenesulfonic acid, trifluoroacetic acid, and hydrochloric acid. Although a carboxylic acid, trifluoroacetic acid does not cap the growing PMO chain if present during the coupling reaction, and its carboxylate is not sufficiently nucleophilic to promote amidate formation. Particularly preferred are trifluoroacetic and especially methanesulfonic acid.

The pyridines useful in forming the pyridinium salts include halogen substituted pyridines, especially the less expensive chloropyridines, of which 3-chloropyridine is preferred, and cyanopyridines, for which 4-cyanopyridine is preferred. The 3- and 4-cyanoopyridines are readily available, inexpensive bulk chemicals. In general, the efficacy of the salts correlates inversely with the pKa of the pyridinium species. Pyridines with electron withdrawing groups range in pKa from about 1 to 4 (Fisher et al. 1964, Rogne 1970).

Also useful are nicotinic acid derivatives (i.e. esters, such as ethyl nicotinate, and nicotinamide), as well as their ketone and aldehyde congeners. Generally, however, these are less potent reagents than the cyanopyridinium salts.

It will be appreciated that salts of heterocycles other than pyridines can function as selective detritylation reagents under the conditions described, provided the pKa of the protonated form is similar to that of substituted pyridines of the invention. Examples may be found in the many tables of pKa for heterocycles found in the literature (e.g. Albert 1963). Examples include thiazole (pKa 2.53), pyridazine (pKa 2.33), pyrazole (pKa 2.47), triazole (pKa 2.30), and substituted derivatives thereof, especially derivatives substituted with EWG as described above.

Two particularly preferred salts are 3-chloropyridinium methanesulfonate (CPM) and 4-cyanopyridinium trifluoroacetate (CYTFA), and particularly preferred embodiments of detritylation reagents include solutions of 2% (w/v) of CPM or CYTFA in 20% trifluoroethanol/DCM (v/v) containing 0.9% ethanol (v/v). As shown in the Table below, use of these reagents resulted in a significant increase in yield over the conventional cyanoacetic acid reagents.

The more acidic CYTFA is found to be slightly more efficient than CPM. However, much of the increase in yield between the CPM and CYTFA reagents in the Table can be attributed to the use of a doubly protected guanine monomer (DPG) in which the O6 position is protected with a 4-(pivaloyloxy)benzyloxy group, as disclosed in the co-owned and concurrently filed provisional application entitled "Improved Synthesis of Morpholino Oligomers using Doubly Protected Guanine Morpholino Subunits". In general, use of the DPG monomer reduces the amount of diaminopurine-containing side products, while the improved detritylation reagents reduce the amount of backbone hydrolyzed or truncated side products.

TABLE 1

| PMO AVI- | SEQ ID NO | Sequence | Detritylation reagent[1] | Guanine Monomer[7] | Scale[2] | Yield |
|---|---|---|---|---|---|---|
| 4126 | 1 | ACGTTGAGGGGCATCGTCGC | CAA | MPG | 54 g[3] | 18% |
| 4557 | 2 | CTGGGATGAGAGCCATCACT | CAA | MPG | 24 g[4] | 18% |
| " | " | " | CAA | MPG | 48 g[5] | 15% |
|  |  |  |  | MPG |  |  |
| 4126 | 1 | ACGTTGAGGGGCATCGTCGC | CPM | MPG | 25 g | 25% |
| " | " | " | CPM | MPG | 25 g | 27% |
| " | " | " | CPM | MPG | 25 g | 30% |
| 4020 | 3 | CTTAGTCATCGAGATCTTCGTG | CPM | MPG | 30 g | 32% |
| 4126 | 1 | ACGTTGAGGGGCATCGTCGC | CYTFA | DPG | 25 g | 49% |
| 4065 | 4 | GTGCTCATGGTGCACGGTC[6] | CYTFA | DPG | 120 g | 46% |
| " | " | " | CYTFA | DPG | 120 g | 49% |
| " | " | " | CYTFA | DPG | 120 g | 50% |

Syntheses were performed in accordance with methods described in co-owned application U.S. Ser. No. 11/801,885, filed May 10, 2007, which is incorporated herein by reference, using the modifications indicated in the table; see Examples 2-5 below. All PMO have a 5'-"tail" and are unsubstituted at the 3'-terminus.
1. CAA=11% Cyanoacetic acid (w/w) in a mixture of 20% acetonitrile/DCM (v/v), CPM=2% 3-Chloropyridinum methanesulfonate (w/v) and 0.9% ethanol (v/v) in 20% trifluoroethanol/DCM (v/v), CYTFA=2% 3-Cyanopyridinum trifluoroacetate (w/v) and 0.9% ethanol (v/v) in 20% trifluoroethanol/DCM (v/v).
2. Scale is weight of starting resin in grams. Resin loading is 480-520 µmol/g.
3. Combined output of 4×12 g and 1×8 g runs.
4. Combined output of 2×12 g runs.
5. Combined output of 4×12 g runs.
6. Addition of the final C subunit was performed with an activated morpholino C subunit with 4-methoxytrityl protection on the morpholine nitrogen.
7. Both MPG and DPG are N2-protected with a phenylacetyl group.

Thus, the invention provides a method of synthesizing a morpholino oligomer with reduced hydrolysis of phosphorodiamidate linkages in the backbone, and preferably a reduced or equivalent level of N−1 deletion species, relative to prior art methods. In another aspect, the invention provides a method of deprotecting a triarylmethyl-protected morpholino ring nitrogen during synthesis of a morpholino oligomer, with reduced hydrolysis of phosphorodiamidate linkages in the backbone of the morpholino oligomer relative to that observed when cyanoacetic acid is used as the deprotecting reagent. Preferably, the method also provides a reduced or equivalent level of N−1 deletion species than would be observed when cyanoacetic acid is used as the deprotecting reagent.

A useful modification of the method is the use of a trityl trapping agent, such as a thiol, to shift the reaction equilibrium towards products. The use of thiol trapping agents has been employed for nucleic acid synthesis (Ravikumar et al., U.S. Pat. No. 5,510,476). Mercaptoethanol is a readily available, inexpensive agent useful for this purpose. The presence of the hydroxyl group is not critical for trapping, because simple thiols such as benzylmercaptan perform equally well. Alcohols, such as ethanol and butanol, and even water also serve as trapping agents of the trityl cation.

EXAMPLES

Example 1

Preparation of CYTFA Pyridinium Salt Detritylation Solution

To a solution of 4-cyanopyridine (10.1 g; 1.055 eq) in dichloromethane (790 mL) is added trifluoroacetic acid (10.5 g; 1.0 eq) followed by 2,2,2-trifluoroethanol (198 mL) and ethanol (10 mL) and the solution is stirred for 10-30 min.

Example 2

Figure 2:
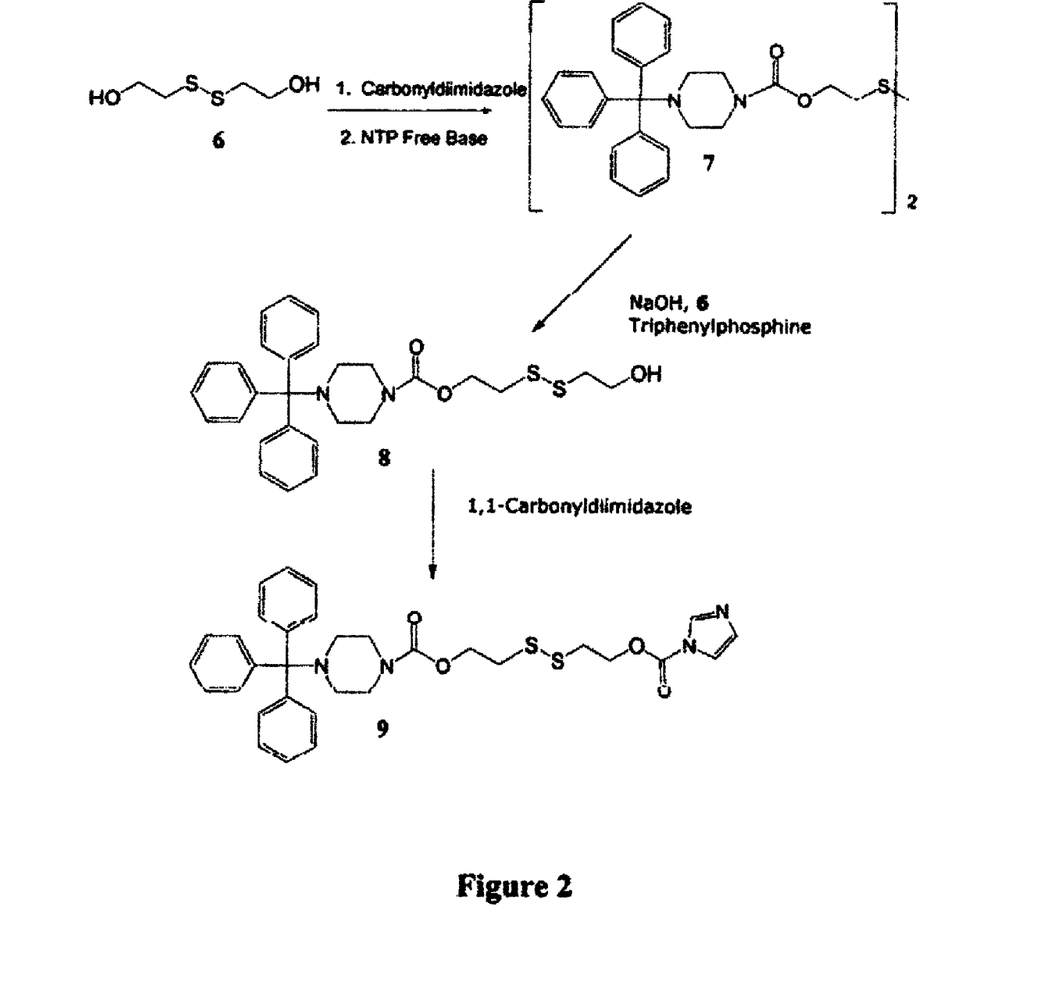
FIG. 2 illustrates the preparation of a disulfide anchor for use in modification of a synthesis resin used for stepwise preparation of a morpholino oligomer.

Preparation of Disulfide Anchor (See FIG. 2)

Preparation of N-trityl piperazine, succinate salt (NTP): To a cooled solution of piperazine (10 eq) in toluene/methanol (5:1 toluene/methanol (v:v); 5 mL/g piperazine) was added slowly a solution of triphenylmethyl (trityl) chloride (1.0 eq) in toluene (5 mL/g trityl chloride). Upon reaction completion (1-2 hr), this solution was washed four times with water. To the resulting organic solution was added an aqueous solution of succinic acid (1.1 eq; 13 mL water/g succinic acid). This mixture was stirred for 90 min, and the solid product was collected by filtration. The crude NTP was purified by two reslurries in acetone. Yield=70%.

Preparation of symmetrical disulfide 2: 1,1'-Carbonyldiimidazole (CDI) (12.402 g; 2.2 eq.) was suspended in dichloromethane (5.25 mL/g) and cooled on an ice bath. Hydroxyethyl disulfide 1 (5.36 g; 1 eq.) was dissolved in dichloromethane (10 mL/g) and tetrahydrofuran (1 mL/g). The diol solution was added to the CDI slowly such that the temperature of the mixture stayed below 4° C. for the duration of the reaction. Upon reaction completion (once addition was complete), de-ionized water (93.8 µL, 0.15 eq.) was added to quench the reaction. Independently, N-trityl piperazine, succinate salt (NTP) (32.59 g; 2.1 eq.) was dissolved in toluene (8 mL/g NTP), dichloromethane (2 mL/g NTP), and methanol (2 mL/g NTP). $K_2CO_3$ (22.09 g; 4.6 eq.) was dissolved in de-ionized water (10 mL/g). The $K_2CO_3$ solution added to the solution of NTP; the mixture was stirred and then separated into two layers. The cloudy organic layer was distilled to remove 90 grams; the resulting water droplets were separated and acetone (8 mL/g NTP) was added to the organic layer. The solution of CDI activated disulfide diol was added to the solution of the free base and concentrated to 225 mL. Acetone (10 mL/g NTP) was added and the mixture was concentrated to 225 mL. The mixture was heated to reflux and solid began crystallizing out of solution. Upon completion, the reaction mixture was cooled and the solid (2) was isolated by filtration. Yield: 27.92 g; 93.1% (based on weight-based assay).

Preparation of disulide alcohol 3: 2 (36.00 g; 32.1 mmol; 1 eq.) was suspended in acetone (2.8 mL/g 2). Hydroxyethyl disulfide (78.51 mL; 20 eq.) was added followed by acetone (1.7 mL/g 2). 5% NaOH/methanol (2.85 mL; 0.1 eq.) was added; the pH of the mixture was 10 by pH paper. Triphenylphosphine (8.42 g; 1 eq.) was added followed by acetone (1.1 mL/g 2). All solids went into solution and then product began to crystallize out. After sixteen hr, the reaction mixture was neutralized with acetic acid (2.4 g; 0.2 eq.). The crude product was isolated by filtration. The crude solid 3 was subjected to two refluxing acetone reslurries (5 mL/g 2).

After filtration the crude product was suspended in dichloromethane (7.25 mL/g 2). The mixture was heated until a clear solution formed (35° C.). The solution was extracted five times with an equal volume of de-ionized water and the final organic layer was concentrated to 155 mL. Dichloromethane was added (4.3 mL/g 2), and the solution was again concentrated to 155 mL. CDI (9.17 g; 1.1 eq.) was added and the mixture was stirred at room temperature. Upon reaction completion (~20 min) the reaction mixture was washed twice with an equal volume of de-ionized water, then ethylbenzene (2.1 mL/g 2) was added. The solution was concentrated to 65.2 g, reducing the dichloromethane in the solution to 0.17%, and stirred on an ice bath to crystallize the product. The product 4 was isolated by filtration. Yield: 44%.

Example 3

Figure 3:
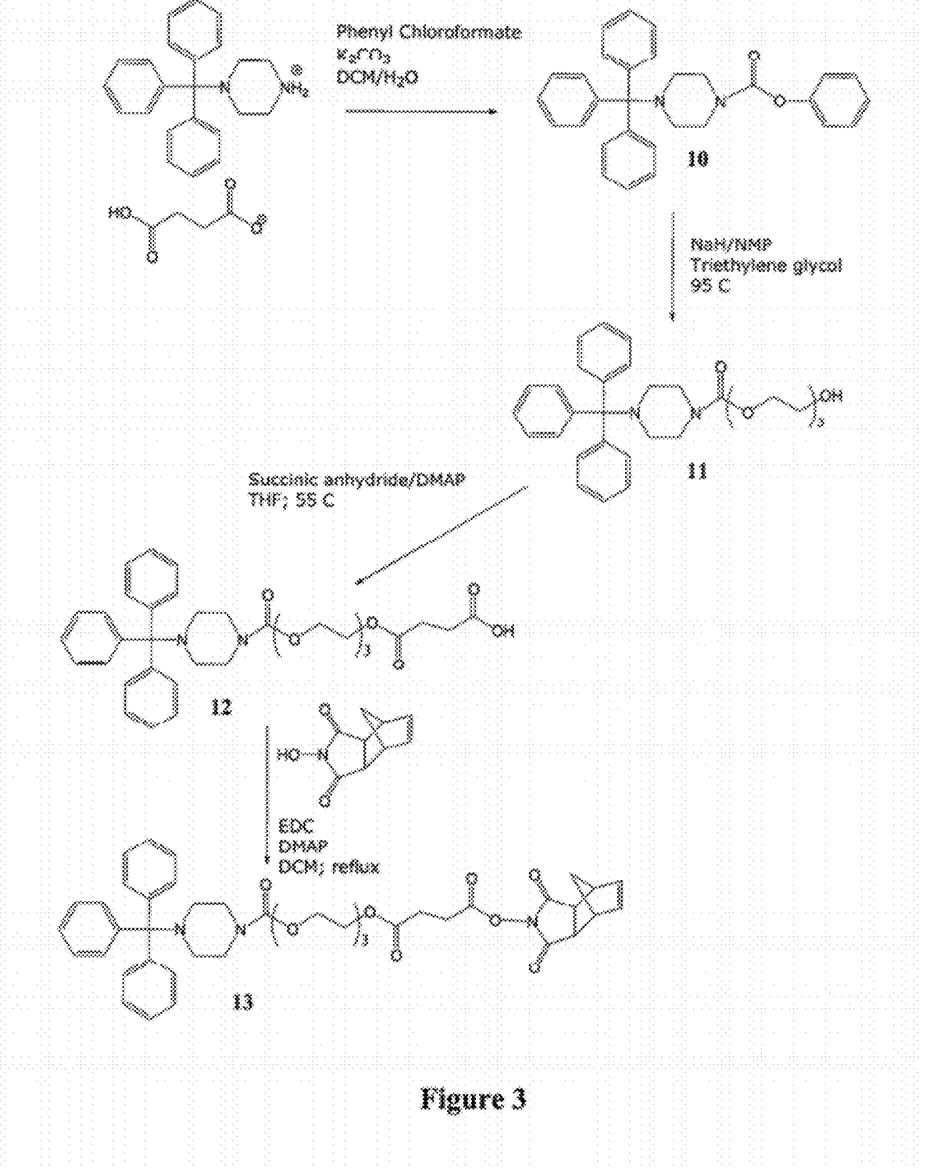
FIG. 3 illustrates the preparation of a triethylene glycol containing moiety ("Tail") which increases aqueous solubility of synthetic antisense oligomers.

Triethylene Glycol Tail (See FIG. 3)

Preparation of trityl piperazine phenyl carbamate 5: To a cooled suspension of NTP in dichloromethane (6 mL/g NTP) was added a solution of potassium carbonate (3.2 eq) in water (4 mL/g potassium carbonate). To this two-phase mixture was slowly added a solution of phenyl chloroformate (1.03 eq) in dichloromethane (2 g/g phenyl chloroformate). The reaction mixture was warmed to 20° C. Upon reaction completion (1-2 hr), the layers were separated. The organic layer was washed with water, and dried over anhydrous potassium carbonate. The product 5 was isolated by crystallization from acetonitrile. Yield=80%.

Preparation of carbamate alcohol 6: Sodium hydride (1.2 eq) was suspended in 1-methyl-2-pyrrolidinone (32 mL/g sodium hydride). To this suspension were added triethylene glycol (10.0 eq) and compound 5 (1.0 eq). The resulting slurry was heated to 95° C. Upon reaction completion (1-2 hr), the mixture was cooled to 20° C. To this mixture was added 30% dichloromethane/methyl tert-butyl ether (v:v) and water. The product-containing organic layer was washed successively with aqueous NaOH, aqueous succinic acid, and saturated aqueous sodium chloride. The product 6 was isolated by crystallization from dichloromethane/methyl tert-butyl ether/heptane. Yield=90%.

Preparation of Tail acid 7: To a solution of compound 6 in tetrahydrofuran (7 mL/g 6) was added succinic anhydride (2.0 eq) and DMAP (0.5 eq). The mixture was heated to 50° C. Upon reaction completion (5 hr), the mixture was cooled to 20° C. and adjusted to pH 8.5 with aqueous $NaHCO_3$. Methyl tert-butyl ether was added, and the product was extracted into the aqueous layer. Dichloromethane was added, and the mixture was adjusted to pH 3 with aqueous citric acid. The product-containing organic layer was washed with a mixture of pH=3 citrate buffer and saturated aqueous sodium chloride. This DCM solution of 7 was used without isolation in the preparation of compound 8.

Preparation of 8: To the solution of compound 7 was added N-hydroxy-5-norbornene-2,3-dicarboxylic acid imide (HONB) (1.02 eq), 4-dimethylaminopyridine (DMAP) (0.34 eq), and then 1-(3-dimethylaminopropyl)-N'-ethylcarbodiimide hydrochloride (EDC) (1.1 eq). The mixture was heated to 55° C. Upon reaction completion (4-5 hr), the mixture was cooled to 20° C. and washed successively with 1:1 0.2 M citric acid/brine and brine. The dichloromethane solution underwent solvent exchange to acetone and then to N,N-dimethylformamide, and the product was isolated by precipitation from acetone/N,N-dimethylformamide into saturated aqueous sodium chloride. The crude product was reslurried several times in water to remove residual N,N-dimethylformamide and salts. Yield=70% of 8 from compound 6. Introduction of the activated "Tail" onto the disulfide anchor-resin was performed in NMP by the procedure used for incorporation of the subunits during solid phase synthesis.

Example 4

Preparation of the Solid Support for Synthesis of Morpholino Oligomers

Example 4a

Preparation of Aminomethylpolystyrene-Disulfide Resin

This procedure was performed in a silanized, jacketed peptide vessel (custom made by ChemGlass, NJ, USA) with a coarse porosity (40-60 μm) glass frit, overhead stirrer, and 3-way Teflon stopcock to allow $N_2$ to bubble up through the frit or a vacuum extraction. Temperature control was achieved in the reaction vessel by a circulating water bath.

The resin treatment/wash steps in the following procedure consist of two basic operations: resin fluidization and solvent/solution extraction. For resin fluidization, the stopcock was positioned to allow $N_2$ flow up through the frit and the specified resin treatment/wash was added to the reactor and allowed to permeate and completely wet the resin. Mixing was then started and the resin slurry mixed for the specified time. For solvent/solution extraction, mixing and $N_2$ flow were stopped and the vacuum pump was started and then the stopcock was positioned to allow evacuation of resin treatment/wash to waste. All resin treatment/wash volumes were 15 mL/g of resin unless noted otherwise.

To aminomethylpolystyrene resin (100-200 mesh; ~1.0 mmol/g $N_2$ substitution; 75 g, 1 eq, Polymer Labs, UK, part #1464-X799) in a silanized, jacketed peptide vessel was added 1-methyl-2-pyrrolidinone (NMP; 20 ml/g resin) and the resin was allowed to swell with mixing for 1-2 hr. Following evacuation of the swell solvent, the resin was washed with dichloromethane (2×1-2 min), 5% diisopropylethylamine in 25% isopropanol/dichloromethane (2×3-4 min) and dichloromethane (2×1-2 min). After evacuation of the final wash, the resin was fluidized with a solution of disulfide anchor 4 in 1-methyl-2-pyrrolidinone (0.17 M; 15 mL/g resin, ~2.5 eq) and the resin/reagent mixture was heated at 45° C. for 60 hr. On reaction completion, heating was discontinued and the anchor solution was evacuated and the resin washed with 1-methyl-2-pyrrolidinone (4×3-4 min) and dichloromethane (6×1-2 min). The resin was treated with a solution of 10% (v/v) diethyl dicarbonate in dichloromethane (16 mL/g; 2×5-6 min) and then washed with dichloromethane (6×1-2 min). The resin 9 was dried under a $N_2$ stream for 1-3 hr and then under vacuum to constant weight (±2%). Yield: 110-150% of the original resin weight.

Example 4b

Determination of the Loading of Aminomethylpolystyrene-Disulfide Resin

The loading of the resin (number of potentially available reactive sites) is determined by a spectrometric assay for the number of triphenylmethyl (trityl) groups per gram of resin.

A known weight of dried resin (25±3 mg) is transferred to a silanized 25 ml volumetric flask and ~5 mL of 2% (v/v) trifluoroacetic acid in dichloromethane is added. The contents are mixed by gentle swirling and then allowed to stand for 30 min. The volume is brought up to 25 mL with additional 2% (v/v) trifluoroacetic acid in dichloromethane and the contents thoroughly mixed. Using a positive displacement pipette, an aliquot of the trityl-containing solution (500 μL) is transferred to a 10 mL volumetric flask and the volume brought up to 10 mL with methanesulfonic acid.

The trityl cation content in the final solution is measured by UV absorbance at 431.7 nm and the resin loading calculated in trityl groups per gram resin (μmol/g) using the appropriate volumes, dilutions, extinction coefficient ($\epsilon$: 41 μmol$^{-1}$ cm$^{-1}$) and resin weight. The assay is performed in triplicate and an average loading calculated.

The resin loading procedure in this example will provide resin with a loading of approximately 500 μmol/g. A loading of 300-400 in μmol/g was obtained if the disulfide anchor incorporation step is performed for 24 hr at room temperature.

Example 4c

Figure 4:
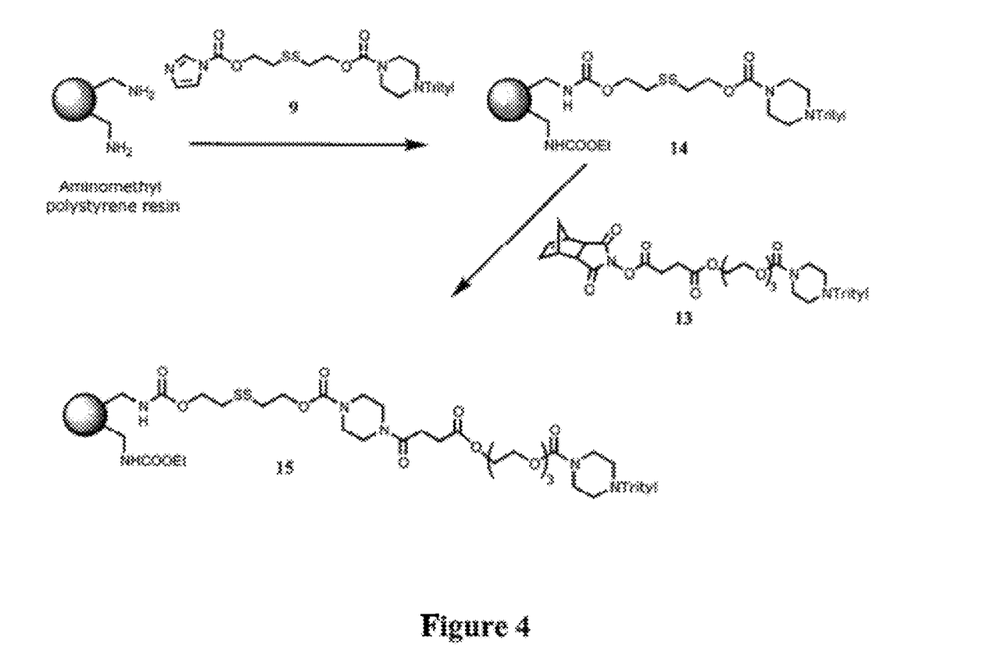
FIG. 4 illustrates the preparation of resins useful for the solid phase synthesis of morpholino oligomers.

Tail Loading (See FIG. 4)

Using the same setup and volumes as for the preparation of aminomethylpolystyrene-disulfide resin, the Tail can be introduced into the molecule. For the coupling step, a solution of 8 (0.2 M) in NMP containing 4-ethylmorpholine (NEM, 0.4 M) was used instead of the disulfide anchor solution. After 2 hr at 45° C., the resin 10 was washed twice with 5% diisopropylethylamine in 25% isopropanol/dichloromethane and once with DCM. To the resin was added a solution of benzoic anhydride (0.4 M) and NEM (0.4 M). After 25 min, the reactor jacket was cooled to room temperature, and the resin washed twice with 5% diisopropylethylamine in 25% isopropanol/dichloromethane and eight times with DCM. The resin 10 was filtered and dried under high vacuum. The loading for resin 10 is defined to be the loading of the original aminomethylpolystyrene-disulfide resin 9 used in the Tail loading.

Example 5

Synthesis of Morpholino Oligomers

Example 5a

Solid Phase Synthesis

Protected oligomers were prepared manually by solid phase oligomer synthesis on aminomethylpolystyrene-disulfide resin (~500 μmol/g loading) at 10 g scale (starting resin weight). Solutions used were as follows:

Detritylation solutions: CAA=11% Cyanoacetic acid (w/w) in a mixture of 20% acetonitrile/DCM (v/v);

CPM=2% 3-Chloropyridinum methanesulfonate (w/v) and 0.9% ethanol (v/v) in 20% trifluoroethanol/DCM (v/v);

CYTFA=2% 3-Cyanopyridinum trifluoroacetate (w/v) and 0.9% ethanol (v/v) in 20% trifluoroethanol/DCM (v/v);

Neutralization solution: 5% diisopropylethylamine in 25% isopropanol/DCM;

Coupling solutions: 0.165 M (for DPG, MPG, U or T subunits) or 0.18 M (for $A^{Bz}$ and $C^{Bz}$ subunits) activated Morpholino Subunit and 0.4 M N-ethylmorpholine in 1,3-dimethylimidazolidinone (DMI).

Activated MPG (protected at N2 with a phenylacetyl group) was prepared as in Summerton et al. (1993).

After transfer of the resin to the synthesis reactor and prior to initiating synthesis cycles, 1-methyl-2-pyrrolidinone (NMP, 20 mL/g resin) was added and allowed to sit for 1-2 hrs. After washing 2 times with dichloromethane (10 mL/g resin), the following synthesis cycle was used with addition of the appropriate coupling solution of activated Morpholino Subunit of the desired base and desired linkage type at each cycle to give the proper sequence.

| Step | Volume (mL/g of starting resin)* | Time (min) |
|---|---|---|
| DCM | 10-30 | 1-2 |
| DCM | 10-30 | 1-2 |
| Detritylation A | 10-30 | 2-3 |
| Detritylation A | 10-30 | 2-3 |
| Detritylation A | 10-30 | 2-3 |
| Detritylation A | 10-30 | 2-3 |
| Detritylation A | 10-30 | 2-3 |
| Neutralization A | 10-30 | 3-4 |
| Neutralization A | 10-30 | 3-4 |
| Neutralization A | 10-30 | 3-4 |
| Neutralization A | 10-30 | 3-4 |
| DCM | 10-30 | 1-2 |
| DCM | 10-30 | 1-2 |
| Coupling | 7-12** | 90 |
| Neutralization A | 10-30 | 1-2 |
| Neutralization A | 10-30 | 1-2 |
| Neutralization A | 10-30 | 1-2 |
| Neutralization A | 10-30 | 1-2 |
| DCM | 10-30 | 1-2 |

*Wash volumes are incremented to account for resin swelling; volume is 10 mL/g of actual resin volume at each cycle
**Coupling volumes are sufficient to maintain good mixing and are incremented to account for resin swelling After incorporation of the final subunit, a final cycle (methoxytritylation) was performed with 0.32 M 4-methoxytriphenylmethyl chloride and 0.4 M N-ethylmorpholine in DMI. After methoxytritylation, the resin was washed 8 times with NMP and then treated with cleavage solution consisting of 0.1 M 1,4-dithiothreitol (DTT) and 0.73 M triethylamine in NMP (27 mL/g starting resin) for 30 min. After collection of the protected oligomer solution, the resin (significantly reduced in volume) was washed with two additional portions of cleavage solution (13 mL/g starting resin for 15 min each) and the washes were combined with the bulk solution. To the protected oligomer solution in an appropriately sized pressure bottle with Teflon plug (Ace Glass, NJ, USA) was added concentrated aqueous ammonia (106 mL/g starting resin, previously cooled to −20° C.), the bottle sealed, and the contents mixed by swirling. The bottle was placed in a 45° C. oven for 16-20 hr to remove base and backbone protecting groups.

Following ammonolysis, the crude oligomer solution is cooled to room temperature and then diafiltered against 0.28% aqueous ammonia using a PLBC 3kd Regenerated Cellulose membrane (Millipore) to remove solvents and small molecules prior to ion exchange chromatography.

Example 5b

Purification of Morpholino Oligomers by Anion Exchange Chromatography

The crude oligomer solution obtained from diafiltration is adjusted to pH 11-11.5 and loaded onto a column of ToyoPearl Super-Q 650S anion exchange resin (Tosoh Bioscience). The methoxytritylated oligomer is eluted with a gradient of 5-35% B over 17 column volume (Buffer A: 10 mM sodium hydroxide; Buffer B: 1 M sodium chloride in 10 mM sodium hydroxide) and fractions of acceptable purity (anion exchange HPLC and mass spec) pooled.

Example 5c

Demethoxytritylation of Morpholino Oligomers

To the pooled fractions from anion exchange chromatography is added acetonitrile (10% by volume) followed by 2 M $H_3PO_4$ to adjust the pH to 3. The solution is mixed for 45 min and then neutralized with concentrated aqueous ammonia to pH 7. The oligomer solution is diafiltered against 20 mM sodium acetate using a PLBC 3kd Regenerated Cellulose membrane (Millipore) to exchange buffers prior to cation exchange chromatography.

Example 5d

Purification of Morpholino Oligomers by Cation Exchange Chromatography

The oligomer solution is adjusted to pH 4.5 with acetic acid and loaded onto a column of Source 30S cation exchange resin (GE Healthcare). The oligomer is eluted with a gradient of 0-35% B over 17 column volumes (Buffer A: 20 mM sodium acetate, 25% acetonitrile, pH 4.5; Buffer B: 0.5 M sodium chloride, 20 mM sodium acetate, 25% acetonitrile, pH 4.5) and fractions of acceptable purity (cation exchange HPLC and mass spec) pooled.

The invention claimed is:

1. A method of synthesizing a morpholino oligomer, the method comprising:
   (a) reacting a solid-phase-supported morpholino subunit comprising an unprotected morpholino ring nitrogen with a first morpholino subunit monomer comprising a triarylmethyl-protected morpholino ring nitrogen and an activated phosphoramidate group on a 5'-exocyclic carbon, thereby forming a phosphorodiamidate linkage between the 5'-exocyclic carbon of the first morpholino subunit monomer and the unprotected morpholino ring nitrogen of the solid-phase supported morpholino subunit monomer;
   (b) deprotecting the triarylmethyl-protected morpholino ring nitrogen, to form a product comprising an unprotected morpholino ring nitrogen;
   (c) optionally reacting the product from step (b) with a further morpholino subunit monomer comprising a triarylmethyl-protected morpholino ring nitrogen and an activated phosphoramidate group on a 5'-exocyclic carbon, thereby forming a phosphorodiamidate linkage between the 5'-exocyclic carbon of the further morpholino subunit monomer and the unprotected morpholino ring nitrogen of the product from step (b); and
   (d) optionally repeating steps (b) and (c) one or more times;
   wherein the deprotecting comprises exposing the triarylmethyl-protected ring nitrogen to a reagent solution comprising a heterocyclic amine salt in a trifluoroethanol-containing solvent, the salt being a salt of a heterocyclic amine with a sulfonic acid, trifluoroacetic acid or hydrochloric acid and having a pKa in the range of 1-4 in its protonated form.

2. The method of claim 1, wherein the heterocyclic amine is pyridine, thiazole, pyridazine, pyrazole or triazole, wherein the pyridine, thiazole, pyridazine, pyrazole or triazole is substituted with one or more electron withdrawing groups.

3. The method of claim 2, wherein the heterocyclic amine is pyridine substituted with one or more electron withdrawing groups.

4. The method of claim 2, wherein the electron withdrawing group is halogen, cyano, aldehyde, keto, carboxyester or carboxamide.

5. The method of claim 3, wherein the heterocyclic amine is pyridine substituted with chloro or cyano.

6. The method of claim 1, wherein the salt is an alkylsulfonate, a (fluoroalkyl)sulfonate a p-toluenesulfonate or a trifluoroacetate salt.

7. The method of claim 6, wherein the salt is 4 cyanopyridinium trifluoroacetate (CYTFA).

8. The method of claim 1, wherein the trifluoroethanol-containing solvent comprises dichloromethane and trifluoroethanol at a volume ratio of dichloromethane to trifluoroethanol ranging from 90:10 to 25:75.

9. The method of claim 8, wherein the volume ratio is 80:20.

10. The method of claim 1, wherein the triarylmethyl is trityl, 4-methoxytrityl, 4-methyltrityl, 4,4'-dimethyltrityl or 4,4',4''-trimethyltrityl.

11. The method of claim 1, wherein the morpholino oligomer comprises SEQ ID NO: 1, SEQ ID NO: 2, SEQ ID NO: 3 or SEQ ID NO: 4.

12. The method of claim 6, wherein the salt is 3-chloropyridinium methanesulfonate (CPM).

13. The method of claim 1, wherein the trifluoroethanol-containing solvent further comprises ethanol.

* * * * *

UNITED STATES PATENT AND TRADEMARK OFFICE
CERTIFICATE OF CORRECTION

| | |
|---|---|
| PATENT NO. | : 8,299,206 B2 |
| APPLICATION NO. | : 12/271036 |
| DATED | : October 30, 2012 |
| INVENTOR(S) | : Christina Mary Josephine Fox et al. |

It is certified that error appears in the above-identified patent and that said Letters Patent is hereby corrected as shown below:

In the Claims:

Column 16, Lines 24-25:
"7. The method of claim 6, wherein the salt is 4 cyanopyridinium trifluoroacetate (CYTFA)."
Should read, --7. The method of claim 6, wherein the salt is 4-cyanopyridinium trifluoroacetate (CYTFA).--.

Signed and Sealed this
Thirtieth Day of July, 2013

Teresa Stanek Rea
*Acting Director of the United States Patent and Trademark Office*